United States Patent
Kim et al.

(10) Patent No.: US 9,745,494 B2
(45) Date of Patent: Aug. 29, 2017

(54) PRESSURE-SENSITIVE ADHESIVE COMPOSITION FOR OPTICAL FILM

(71) Applicants: No Ma Kim, Daejeon (KR); In Ho Hwang, Daejeon (KR); In Kyu Park, Deajeon (KR); Sung Soo Yoon, Daejeon (KR); Min Ki Lee, Daejeon (KR)

(72) Inventors: No Ma Kim, Daejeon (KR); In Ho Hwang, Daejeon (KR); In Kyu Park, Deajeon (KR); Sung Soo Yoon, Daejeon (KR); Min Ki Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/031,402

(22) Filed: Sep. 19, 2013

(65) Prior Publication Data
US 2014/0016068 A1   Jan. 16, 2014

Related U.S. Application Data

(63) Continuation of application No. PCT/KR2012/002155, filed on Mar. 23, 2012.

(30) Foreign Application Priority Data

Mar. 23, 2011 (KR) .......................... 10-2011-0025999
Mar. 23, 2012 (KR) .......................... 10-2012-0029991

(51) Int. Cl.
| | | |
|---|---|---|
| *C09J 133/08* | (2006.01) | |
| *C09J 133/04* | (2006.01) | |
| *C09J 175/04* | (2006.01) | |
| *G02B 5/30* | (2006.01) | |
| *G02F 1/1335* | (2006.01) | |
| *C08F 220/18* | (2006.01) | |
| *C09J 133/06* | (2006.01) | |
| *C09J 7/02* | (2006.01) | |

(52) U.S. Cl.
CPC ........... *C09J 133/08* (2013.01); *C08F 220/18* (2013.01); *C09J 7/0217* (2013.01); *C09J 133/04* (2013.01); *C09J 133/066* (2013.01); *C09J 175/04* (2013.01); *G02B 5/3033* (2013.01); *G02F 1/133528* (2013.01); *C09J 2201/622* (2013.01); *C09J 2203/318* (2013.01)

(58) Field of Classification Search
CPC .... C08F 220/06; C08F 220/18; C08F 220/20; C08F 2220/1825; C09J 133/04; C09J 133/08; C09J 133/066; C09J 2201/622; C09J 2203/318; C09J 7/0217; G02B 5/3033; G02F 1/133528
See application file for complete search history.

(56) References Cited

U.S. PATENT DOCUMENTS

| | | | | |
|---|---|---|---|---|
| 7,862,888 | B2* | 1/2011 | Toyama et al. | 428/354 |
| 8,927,071 | B2* | 1/2015 | Hattori | C08G 18/6216 |
| | | | | 428/1.54 |
| 2009/0068459 | A1* | 3/2009 | Kishioka et al. | 428/355 CN |
| 2009/0104450 | A1* | 4/2009 | Inoue et al. | 428/423.1 |
| 2010/0112348 | A1* | 5/2010 | Kondo et al. | 428/355 CN |
| 2010/0208343 | A1* | 8/2010 | Yoshida | C08F 220/18 |
| | | | | 359/485.01 |
| 2011/0007244 | A1* | 1/2011 | Kim et al. | 349/96 |

FOREIGN PATENT DOCUMENTS

| | | | |
|---|---|---|---|
| CN | 1490371 A | 4/2004 | |
| CN | 1862330 A | 11/2006 | |
| CN | 101910345 A | 12/2010 | |
| JP | 2002-047468 A | 2/2002 | |
| JP | 2004-269564 A | 9/2004 | |
| JP | 2005-97451 | 4/2005 | |
| JP | 2007-138056 A | 6/2007 | |
| JP | 2009-173772 A | 8/2008 | |
| JP | 2009-173720 A | 8/2009 | |
| JP | 2009-215528 | 9/2009 | |
| JP | 2009-242767 A | 10/2009 | |
| JP | 4381686 | 10/2009 | |
| JP | WO 2010024103 A1 * | 3/2010 | ............ C08G 18/10 |
| KR | 10-2004-0030280 | 4/2004 | |
| KR | 10-2007-0055363 | 5/2007 | |
| KR | 10-2009-0077664 A | 7/2009 | |
| KR | 10-2009-00126904 | 12/2009 | |
| WO | WO 2009088205 A3 * | 9/2009 | |
| WO | 2009131321 A2 | 10/2009 | |

\* cited by examiner

*Primary Examiner* — Satya Sastri
(74) *Attorney, Agent, or Firm* — Dentons US LLP

(57) ABSTRACT

A pressure-sensitive adhesive composition for an optical film, a method of preparing a pressure-sensitive adhesive for an optical film, a polarizing plate and a liquid crystal display are provided. The pressure-sensitive adhesive composition may be effectively coated even when a coating solid content is controlled to be high. Therefore, productivity in formation of a pressure-sensitive adhesive or manufacture of an optical film such as a polarizing plate may be significantly increased, and excellent durability and reliability and reworkability may be exhibited after the pressure-sensitive adhesive is prepared.

7 Claims, No Drawings

PRESSURE-SENSITIVE ADHESIVE COMPOSITION FOR OPTICAL FILM

This application is a bypass continuation of International Application No. PCT/KR2012/002155, filed Mar. 23, 2012, which claims priority to Korean Patent Application Nos. 10-2011-0025999, filed on Mar. 23, 2011 and 10-2012-0029991, filed Mar. 23, 2012, in the Korean Intellectual Property Office, all of which are incorporated herein by reference.

BACKGROUND

1. Field of the Invention

The present application relates to a pressure-sensitive adhesive composition for an optical film, a polarizing plate and a liquid crystal display.

2. Discussion of Related Art

A liquid crystal display (LCD) usually includes a liquid crystal panel containing a liquid crystal component injected between two transparent substrates and an optical film. As an optical film, there is a polarizing film, a retardation film or a brightness enhancing film. To laminate these optical films or attach an optical film to an adherent such as a liquid crystal panel, a pressure-sensitive adhesive for an optical film is generally used.

A pressure-sensitive adhesive may use an acrylic polymer, rubber, a urethane resin, a silicon resin or ethylene vinyl acetate (EVA) resin, and as a pressure-sensitive adhesive for an optical film, particularly, a polarizing plate, a pressure-sensitive adhesive including an acrylic polymer which has excellent transparency, and high resistance to oxidation or yellowing is generally used.

Such a pressure-sensitive adhesive is prepared by coating a pressure-sensitive coating solution including an acrylic polymer and a crosslinking agent, that is, a pressure-sensitive adhesive composition, and then curing the composition. Meanwhile, to ensure durability and cohesive strength required for the pressure-sensitive adhesive particularly used for a polarizing plate, an acrylic polymer having a weight average molecular weight of 1,500,000 to 2,000,000 is usually included in the pressure sensitive adhesive composition.

The density of such a pressure-sensitive adhesive composition including a polymer having a large weight average molecular weight increases as the coating solid content included therein is set higher. Accordingly, when a large amount of solvent is input to coat a pressure-sensitive adhesive solution, coating productivity and coating uniformity are significantly decreased.

However, when the weight average molecular weight of the polymer is decreased to solve the above-mentioned problem, durability and re-workability of the pressure-sensitive adhesive are drastically decreased.

A method of preparing a pressure-sensitive adhesive by repeating a coating process will be used to achieve the desired thickness, but the coating solid content is set low. However, the method has problems of decreased productivity with respect to production cost, and difficulty in precise control of the thickness of the pressure-sensitive adhesive.

Japanese Patent Laid-Open No. 2011-057794 (Reference 1) discloses an attempt to increase the coating solid content and satisfy durability by blending multifunctional isocyanate and a radical initiator with an acrylic polymer having an average molecular weight of 500,000 to 1,000,000. However, it is necessary to increase drying temperature or drying time after coating in order to prevent residue of the radical initiator from forming.

Japanese Patent Laid-Open No. 2004-091500 (Reference 2) discloses an attempt to add a carboxyl, amide or amino group to an acrylic polymer with a hydroxyl group, which has a weight average molecular weight of 500,000 to 2,000,000, and adjust gel content after being crosslinked at 1 to 50%. However, a pressure-sensitive adhesive prepared by an above-mentioned method is difficult to be used in practice due to considerably low re-workability and great change with the passage of time.

SUMMARY OF THE INVENTION

The present application provides a pressure-sensitive adhesive composition for an optical film, a polarizing plate and a liquid crystal display.

One aspect of the present application provides a pressure-sensitive adhesive composition for an optical film. The pressure-sensitive adhesive composition may include an acrylic polymer having a weight average molecular weight ($M_w$) of 700,000 to 1,200,000. The acrylic polymer may include at least one monomer having hydroxyl group and at least monomer having carboxyl group as polymerized units. The acrylic polymer may include 2.5 to 5.5 parts by weight of the monomer having hydroxyl group, and 0.05 to 0.3 parts by weight of the monomer having carboxyl group. In the specification, unless specifically defined otherwise, the unit part by weight refers to a ratio between components by weight.

The pressure-sensitive adhesive composition may include the coating solid content in an amount of 20 weight %. In the present application, the term "coating solid content" as used herein may refer to a solid content of a pressure-sensitive adhesive composition at the time that the pressure-sensitive adhesive composition is applied to a coating process in order to prepare a pressure-sensitive adhesive. The solid content may be measured in the manner suggested in the following Example. Conventionally, at the time that the pressure-sensitive adhesive composition is applied to the coating process, the composition may include an acrylic polymer, a crosslinking agent, an initiator, another additive, and also a solvent.

The pressure-sensitive adhesive composition may be a pressure-sensitive adhesive composition for an optical film. The pressure-sensitive adhesive composition for an optical film may be used to laminate an optical film such as a polarizing film, a retardation film, an anti-glare film, a wide viewing angle compensation film or a brightness enhancing film, or attach the optical film or a laminate to an adherent such as a liquid crystal panel. In one example, the pressure-sensitive adhesive composition may be used for a polarizing plate to attach a polarizing film to a liquid crystal panel.

The pressure-sensitive adhesive composition includes an acrylic polymer having a weight average molecular weight of 700,000 to 1,200,000. In the present application, the weight average molecular weight is a conversion value with respect to standard polystyrene measured by gel permeation chromatography (GPC), for example, in the manner described in the following Example. In the specification, unless specifically defined otherwise, the term "molecular weight" as used herein may refer to a "weight average molecular weight." The acrylic polymer may have a molecular weight of 700,000 to 1,150,000; 700,000 to 1,100,000; 700,000 to 1,000,000; 700,000 to 950,000; or 700,000 to 900,000. When the molecular weight of the acrylic polymer is more than 1,200,000, and the pressure-sensitive adhesive composition has a high coating solid content, it is impossible to perform a coating process. Moreover, when the molecular weight is less than 700,000, durability and re-workability of the pressure-sensitive adhesive are significantly degraded.

The acrylic polymer may include a monomer having hydroxyl group and a monomer having carboxyl group as polymerized units. In the present application, the term "monomer having hydroxyl group" as used herein may refer to a monomer capable of being copolymerized with another monomer forming the acrylic polymer and providing a hydroxyl group to a side chain or terminal end of the polymer after copolymerization, and the term "monomer having carboxyl group" as used herein may refer to a monomer capable of being copolymerized with another monomer forming the acrylic polymer and providing a carboxyl group to a side chain or terminal end of the polymer after copolymerization.

The monomer having hydroxyl group may be included in an amount of 2.5 to 5.5 parts by weight, 3 to 5.5 parts by weight, or 3 to 5 parts by weight. When the monomer is included in an amount of 2.5 parts by weight or more, a suitable gel fraction may be maintained after being crosslinked, and durability and reliability and re-workability may be ensured. When the monomer is included in an amount of 5.5 parts by weight or less, suitable gel content may be maintained after being crosslinked and a physical property such as durability and reliability may be ensured. The monomer may be any one capable of being polymerized with another monomer forming an acrylic polymer, for example, a monomer having a carboxyl group or a (meth) acrylic acid ester monomer to be described later, and providing a hydroxyl group to a side chain or terminal end of the polymer after polymerization without limitation. An example of the monomer may be, but is not limited to, a hydroxyalkyl(meth)acrylate such as 2-hydroxyethyl(meth) acrylate, 2-hydroxypropyl(meth)acrylate, 4-hydroxybutyl (meth)acrylate, 6-hydroxyhexyl(meth)acrylate or 8-hydroxyoctyl(meth)acrylate, or a hydroxyalkyleneglycol (meth)acrylate such as 2-hydroxyethyleneglycol(meth) acrylate or 2-hydroxypropyleneglycol(meth)acrylate. One or at least two of the above-mentioned monomers may be included in the polymer.

In addition, a monomer having a carboxyl group may be included in an acrylic polymer in an amount of 0.05 to 0.3 parts by weight, or 0.07 to 0.3 parts by weight. When the monomer is included in an amount of 0.05 parts by weight or more, suitable cure rate and gel fraction may be ensured, and excellent productivity, durability and reliability may be maintained. Moreover, when the monomer is included in an amount of 0.3 parts by weight or less, durability and reliability, and durability and reliability in long-term storage of a pressure-sensitive adhesive composition or pressure-sensitive polarizing plate may be ensured. In addition, the monomer may be any one capable of being copolymerized with another monomer forming an acrylic polymer and providing a carboxyl group to a side chain or terminal end of the polymer after copolymerization without limitation. An example of the monomer may be (meth)acrylic acid, 2-(meth)acryloyloxy acetate, 3-(meth)acryloyloxy propylate, 4-(meth)acryloyloxy butyrate, acrylic acid dimer, itaconic acid, maleic acid or maleic acid anhydride. One or a mixture of at least two of the above-mentioned monomers may be used.

The acrylic polymer may include a (meth)acrylic acid ester monomer as a polymerized unit.

The (meth)acrylic acid ester monomer may be alkyl (meth)acrylate. Here, alkyl(meth)acrylate which contains an alkyl group having 2 to 12 carbon atoms may be used in consideration of the control of cohesive strength, a glass transition temperature and an adhesive property. Examples of the monomer may include methyl(meth)acrylate, ethyl (meth)acrylate, n-propyl(meth)acrylate, isopropyl(meth) acrylate, n-butyl(meth)acrylate, t-butyl (meth)acrylate, sec-butyl(meth)acrylate, pentyl(meth)acrylate, 2-ethylhexyl (meth)acrylate, 2-ethylbutyl(meth)acrylate, n-octyl(meth) acrylate, isobornyl(meth)acrylate, isooctyl(meth)acrylate, isononyl(meth)acrylate and lauryl(meth)acrylate. One or at least two of the above-mentioned monomers may be included in the polymer. For example, the (meth)acrylic acid ester monomer may be included in the acrylic polymer in an amount of 80 to 97.8 parts by weight.

The acrylic polymer may further include another comonomer as a polymerized unit when necessary. The comonomer which may be included additionally may be a nitrogen-containing monomer such as (meth)acrylonitrile, (meth) acrylamide, N-methyl(meth)acrylamide, N-butoxy methyl (meth)acrylamide, N-vinyl pyrrolidone or N-vinyl caprolactame; an alkylene oxide group-containing monomer such as alkoxy alkyleneglycol(meth)acrylic acid ester, alkoxy dialkyleneglycol(meth)acrylic acid ester, alkoxy trialkyleneglycol(meth)acrylic acid ester, alkoxy tetraalkyleneglycol(meth)acrylic acid ester, alkoxy polyethyleneglycol (meth)acrylic acid ester, phenoxy alkyleneglycol(meth) acrylic acid ester, phenoxy dialkyleneglycol(meth)acrylic acid ester, phenoxy trialkyleneglycol(meth)acrylic acid ester, phenoxy tetraalkyleneglycol(meth)acrylic acid ester or phenoxy polyalkyleneglycol(meth)acrylic acid ester; a styrene-based monomer such as styrene or methyl styrene; a glycidyl group-containing monomer such as glycidyl(meth) acrylate; or a carboxylic acid vinyl ester such as vinyl acetate. One or at least two selected from the above-mentioned comonomers may be included in the polymer when necessary. The comonomer may be included in an acrylic polymer in an amount of 20 parts by weight or less, or 0.1 to 15 parts by weight.

The acrylic polymer may be prepared by a conventional polymerization method. For example, the acrylic polymer may be prepared by subjecting a monomer mixture prepared by blending monomers selected according to the composition of a desired monomer, to a polymerization method such as solution polymerization, photo polymerization, bulk polymerization, suspension polymerization or emulsion polymerization. When necessary, in this step, a suitable polymerization initiator, a molecular weight regulator or a chain transfer agent may be used together.

The pressure-sensitive adhesive composition of the present application may further include a multifunctional crosslinking agent as a component capable of crosslinking the acrylic polymer in curing. The term "curing" as used herein may refer to a reaction allowing the pressure-sensitive adhesive composition to exhibit a pressure-sensitive adhesive property through a physical or chemical action, or reaction of components included in the pressure-sensitive adhesive composition. In the present application, in some cases, the terms "curing" and "crosslinking" may have the same meaning as each other. The multifunctional crosslinking agent may be an isocyanate crosslinking agent, an epoxy crosslinking agent, an aziridin crosslinking agent or a metal chelate crosslinking agent, and preferably an isocyanate crosslinking agent.

The isocyanate crosslinking agent may be a diisocyanate compound such as toluene diisocyanate, xylene diisocyanate, diphenylmethane diisocyanate, hexamethylene diisocyanate, isoboron diisocyanate, tetramethylxylene diisocyanate or naphthalene diisocyanate; or a compound produced by reacting the diisocyanate compound with a polyol. As such, the polyol may be trimethylol propane.

In the present application, one or at least two of the above-mentioned crosslinking agents may be used, but the present application is not limited thereto.

The multifunctional crosslinking agent may be included in the pressure-sensitive adhesive composition in an amount of 0.01 to 5 parts by weight relative to 100 parts by weight of the acrylic polymer, and the pressure-sensitive adhesive may maintain excellent gel fraction, cohesive strength and durability within the above range.

The pressure-sensitive adhesive composition may further include a silane coupling agent having a beta-cyano group or acetoacetyl group. The silane coupling agent may allow the pressure-sensitive adhesive formed using an acrylic polymer having a low molecular weight to exhibit excellent adhesion and adhesion stability, and maintain excellent durability and reliability under heat resistance and humidity and heat resistance conditions.

The silane coupling agent having a beta-cyano group or acetoacetyl group may be a compound represented by Formula 1 or 2.

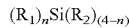  [Formula 1]

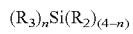  [Formula 2]

In Formula 1 or 2, $R_1$ is a beta-cyanoacetyl group or beta-cyanoacetylalkyl group, $R_3$ is an acetoacetyl group or acetoacetylalkly group, $R_2$ is an alkoxyl group, and n is a number between 1 and 3.

In Formula 1 or 2, an alkyl group may be an alkyl group having 1 to 20, 1 to 16, 1 to 12, 1 to 8, or 1 to 4 carbon atoms. In this case, the alkyl group may be linear, branched or cyclic. In addition, in Formula 1 or 2, an alkoxy group may be an alkoxy group having 1 to 20, 1 to 16, 1 to 12, 1 to 8, or 1 to 4 carbon atoms. In this case, the alkoxy group may be linear, branched or cyclic.

Moreover, in Formula 1, n may be one of 1 to 3, 1 to 2 or 1.

The compound of Formula 1 or 2 may be, but is not limited to, acetoacetylpropyl trimethoxy silane, acetoacetylpropyl triethoxy silane, β-cyanoacetylpropyl trimethoxy silane or β-cyanoacetylpropyl triethoxy silane.

The pressure-sensitive adhesive composition may include 0.01 to 5 parts by weight, or 0.01 to 1 part by weight of the silane coupling agent relative to 100 parts by weight of the acrylic polymer, and when the silane coupling agent is included within the range, it may effectively provide desired physical properties to the pressure-sensitive adhesive.

The pressure-sensitive adhesive composition may further include a pressure-sensitive adhesion providing agent when necessary. The pressure-sensitive adhesion providing agent may include one or a mixture of at least two of a hydrocarbon resin or hydrogenated product thereof, a rosin resin or hydrogenated product thereof, a rosin ester resin or hydrogenated product thereof, a terpene resin or hydrogenated product thereof, a terpene phenol resin or hydrogenated product thereof, a polymerized rosin resin and polymerized rosin ester resin, but the present application is not limited thereto. The pressure-sensitive adhesion providing agent may be included in the pressure-sensitive adhesive composition in an amount of 100 parts by weight or less relative to 100 parts by weight of the acrylic polymer.

The pressure-sensitive adhesive composition may further include at least one additive selected from the group consisting of an epoxy resin, a curing agent, a UV stabilizer, an oxidation preventing agent, a coloring agent, a reinforcing agent, a filler, a foaming agent, a surfactant and a plasticizer within the range that does not affect an effect of the present application.

The coating solid content of the pressure-sensitive adhesive composition may be 20 weight % or more, or 25 weight % or more. When the coating solid content is 20 weight % or more, the productivity of the pressure-sensitive adhesive, optical film or liquid crystal display may be maximized. The upper limit of the coating solid content is not specifically limited, and may be suitably controlled within the range of 50 weight % or less, 40 weight % or less, or 30 weight % or less in consideration of viscosity to be applied to coating.

The pressure-sensitive adhesive composition may have a viscosity (at 23° C.) of 500 to 2,500 cP, 700 to 2,500 cP, or 900 to 2,300 cP in the state that the coating solid content is maintained. That is, the pressure-sensitive adhesive composition may have a viscosity at a level capable of effective coating in the state that the coating solid content is set high.

The pressure-sensitive adhesive composition may have a gel fraction of 55 to 85 weight %, or 60 to 80 weight % after curing or crosslinking. The gel fraction may be calculated by Equation 1.

Gel Fraction (%)=$B/A$×100  [Equation 1]

In Equation 1, A is the weight of the pressure-sensitive adhesive composition after being curing or crosslinking, and B is the dry weight of non-dissolved parts taken after immersing the cured or crosslinked pressure-sensitive adhesive composition in ethyl acetate at room temperature for 72 hours.

When the gel fraction is 55 weight % or more, excellent durability and reliability and re-workability may be maintained, and when the gel fraction is 85 weight % or less, excellent durability and reliability may be maintained.

Another aspect of the present application provides a method of preparing a pressure-sensitive adhesive for an optical film. The method may include coating the pressure-sensitive adhesive composition described above and performing curing or crosslinking.

The present application may maintain excellent productivity and thickness precision, and also maintain excellent physical properties such as re-workability and durability and reliability of the pressure-sensitive adhesive by using the coating solid content of the pressure-sensitive adhesive composition.

A method of coating a pressure-sensitive adhesive composition is not specifically limited, and may be performed by applying a pressure-sensitive adhesive composition to a suitable process base material, for example, a releasable film or an optical film using a conventional means such as a bar coater.

For uniform coating, a multifunctional crosslinking agent included in the pressure-sensitive adhesive composition may be controlled not to perform crosslinking of functional groups during the coating process. Accordingly, a cross-linked structure may be formed in a curing and aging process after the coating of the crosslinking agent, and thereby cohesive strength of the pressure-sensitive adhesive may be improved, and pressure-sensitive adhesive properties and cuttability may be improved.

The coating may be performed after a volatile component or a bubble-forming component such as reaction residue in the pressure-sensitive adhesive composition is sufficiently removed. Accordingly, it may prevent problems such that elasticity of the pressure-sensitive adhesive is decreased due to excessively low crosslinking density or molecular weight, and bubbles present between a glass plate and a pressure-sensitive adhesive layer become larger at a high temperature, thereby forming a scatterer therein.

In the preparation method, a method of curing the pressure-sensitive adhesive composition is not specifically limited, and thus, for example, the coating layer may be maintained at a suitable temperature to induce crosslinking between the acrylic polymer contained in the coating layer and the multifunctional crosslinking agent.

Still another aspect of the present application provides a polarizing plate including a polarizing film and a pressure-sensitive adhesive layer which contains the pressure-sensitive adhesive composition of the present application, is formed on one or both surfaces of the polarizing film and is used to attach the polarizing plate to a liquid crystal panel.

The pressure-sensitive adhesive composition may be included in the pressure-sensitive adhesive layer after curing or crosslinking is performed.

The kind of polarizing film used in the present application is not specifically limited, and thus a general one known in the art may be employed.

The kind of polarizing film included in the polarizing plate of the present application is not specifically limited, and thus a general one known in the art, for example, a polyvinylalcohol-based polarizing film, may be employed without limitation.

The polarizing film is a functional film capable of extracting only light vibrating in one direction from incident light vibrating in various directions. In the polarizing film, a dichroic dye may be adsorbed and arranged to a polyvinylalcohol-based resin film. The polyvinylalcohol-based resin comprising the polarizing film may be obtained by gelating a polyvinylacetate-based resin. In this case, the polyvinylacetate-based resin to be used may also include vinyl acetate and a copolymer of a monomer capable of being copolymerized with the vinyl acetate as well as a mono polymer of the vinyl acetate. The monomer capable of being copolymerized with the vinyl acetate may be, but is not limited to, one or a mixture of at least two of unsaturated carbonates, olefins, vinylethers, unsaturated sulfonates and acrylamides having an ammonium group. Generally, the degree of gelation of the polyvinylalcohol-based resin may be approximately 85 to 100 mol %, and preferably 98 mol % or more. The polyvinylalcohol-based resin may be further modified, and for example, may be polyvinylformal or polyvinylacetal modified with an aldehyde. Generally, the degree of polymerization of the poylvinylalcohol-based resin may be approximately 1,000 to 10,000, or 1,500 to 5,000.

The polarizing film may be manufactured through orienting a polyvinylalcohol-based resin film (e.g., uniaxial orientation), dying the polyvinylalcohol-based resin film with a dichroic dye, adsorbing the dichroic dye, treating the polyvinylalcohol-based resin film to which a dichroic dye is adsorbed with a boric acid aqueous solution, and then washing the polyvinylalcohol resin film. Here, as the dichroic dye, iodine or a dichroic organic pigment may be used.

The polarizing plate of the present application may further include a protecting film attached to one or both surfaces of the polarizing film, and in this case, the pressure-sensitive adhesive layer may be formed to one surface of the protecting film. The kind the protecting film is not specifically limited, and thus may be a cellulose-based film such as formed of triacetyl cellulose (TAC); a polyester-based film such as a polycarbonate or poly(ethylene terephthalate) (PET) film; a polyethersulfone-based film; and a film having one or a stacked structure having at least two of a polyethylene film, a polypropylene film and a polyolefin-based film manufactured using a resin having a cyclo-based or norbornene structure or an ethylene-propylene copolymer.

The polarizing plate may further include at least one functionalized layer selected from the group consisting of a protecting layer, a reflective layer, an anti-glare layer, a retardation plate, a wide viewing angle compensating film and a brightness enhancing film.

In the present application, a method of forming a pressure-sensitive adhesive layer on the polarizing plate is not specifically limited, but a method of preparing a pressure-sensitive adhesive may be, for example, applied. In this case, a method of directly coating and curing a pressure-sensitive adhesive composition to the polarizing plate, or a method of coating and curing a pressure-sensitive adhesive composition to a release-treated surface of a releasable film and transferring the resulting composition to the polarizing plate may be used.

Yet another aspect of the present application provides a liquid crystal display including a liquid crystal panel and the polarizing plate attached to one or both surfaces of the liquid crystal panel.

As a liquid crystal panel in the device, a known panel such as a passive matrix-type panel such as a twisted nematic (TN), super twisted nematic (STN), ferroelectric (F) or polymer dispersed (PD) panel, an active matrix-type panel such as a two or three terminal panel, an in-plane switching (IPS) panel or a vertical alignment (VA) panel may be used.

Another kind of component of the liquid crystal display, for example, a color filter substrate or an upper and lower substrate such as an array substrate, is not specifically limited, and a conformation known in the art may be employed without limitation.

DETAILED DESCRIPTION OF EXEMPLARY EMBODIMENTS

Hereinafter, a pressure-sensitive adhesive composition will be described in detail through Example and Comparative Example, but a range of the pressure-sensitive adhesive composition is not limited by the following Example.

In the following Examples and Comparative Examples, respective physical properties were evaluated by the following methods:

1. Weight Average Molecular Weight of Polymer

A weight average molecular weight and molecular weight distribution of acrylic polymers were measured using GPC according to the following condition. To plot a calibration curve, standard polystyrene produced by Agilent System was used, and the measurement result was converted.

<Condition for Measuring Weight Average Molecular Weight>

Measurer: Gel Permeation Chromatography (Waters Alliance System)

Column: PL Mixed B type

Detector: Refractive Index Detector

Column Flow Rate and Solvent: 1 mL/min, tetrahydrofuran (THF)

Analysis Temperature and Measuring Amount: 40° C., 200 µl

2. Evaluation of the Coating Solid Content

The coating solid content was measured by the following method:

<Order of Measuring the Coating Solid Content>
1) Weight (A) of an aluminum dish was measured.
2) Approximately 0.3 to 0.5 g of a pressure-sensitive adhesive composition (sample before being dried) prepared in Example or Comparative Example was taken and put in the aluminum dish whose weight was measured in advance.
3) A small amount of a polymerization inhibitor solution (hydroquinone) (concentration: 0.5 weight %) dissolved in ethyl acetate was added to the pressure-sensitive adhesive using a pipette.
4) The resulting solution was dried in a 150° C. oven for approximately 30 minutes so as to remove solvent.
5) The solution was cooled at room temperature for approximately 15 to 30 minutes, and the weight of the remaining component (weight of the sample after being dried) was measured.
6) The coating solid content was measured according to the following Equation:

$$\text{Coating TSC (solid content, unit:\%)} = (DS-A)/(S+E) \times 100$$

DS: Weight of Aluminum Dish+Weight of Sample After being Dried (unit: g)
A: Weight of Aluminum Dish (unit: g)
S: Weight of Sample before being Dried (unit: g)
E: Weight of Removed Component (ex. Solvent) (unit: g)
3. Evaluation of Coatability Coatability exhibited during coating process of a pressure-sensitive adhesive composition prepared in Example or Comparative Example was evaluated by observing the state of a coating layer with the naked eyes according to the following criteria:

<Criteria for Evaluating Coatability>
○: Neither bubbles nor stripes on a coating layer were observed with the naked eyes.
Δ: Fine bubbles and/or stripes on a coating layer were observed with the naked eyes.
×: Bubbles and/or stripes on a coating layer were clearly observed with the naked eyes.

4. Measurement of Gel Fraction

A pressure-sensitive adhesive layer prepared in Example or Comparative Example was maintained in a constant temperature and humidity chamber (23° C., relative humidity: 60%) for 10 days. Then 0.3 g of the pressure-sensitive adhesive layer was taken and put in a #200 stainless wire mesh. The mesh was then put into 100 mL of ethyl acetate so as for the pressure-sensitive adhesive layer to be completely submerged in the ethyl acetate, and then maintained in a dark room at room temperature for 3 days. Then, portions (non-dissolved parts) of the pressure-sensitive adhesive layer, which were not dissolved in the ethyl acetate, was taken, and then dried at 70° C. for 4 hours so as to measure the weight (dry weight of the non-dissolved parts) of the non-dissolved parts.

Then the gel fraction (unit: %) was measured by substituting the measured results to the following Equation:

[Equation for Measuring Gel Fraction]

$$\text{Gel Fraction} = B/A \times 100$$

A: Weight of the Pressure-Sensitive Adhesive (0.3 g)
B: Dry Weight of the Non-dissolved Parts (unit: g)

5. Evaluation of Re-Workability

A specimen was manufactured by cutting a pressure-sensitive polarizing plate formed in Example or Comparative Example so as to have a width of 90 nm and a length of 170 mm. Subsequently, a releasable PET film attached to a pressure-sensitive adhesive layer was peeled, and then the pressure-sensitive adhesive polarizing plate was attached to a non-alkali glass (Corning) using a 2 kg roller according to the JIS Z 0237. The non-alkali glass to which the polarizing plate was attached was left in a constant temperature and humidity chamber (23° C., relative humidity: 60%) for approximately 1 hour, heated at 50° C. for 4 hours, and then left at room temperature for 1 hour. Afterward, the polarizing plate was peeled from the non-alkali glass at a peel rate of 300 mm/min and a peel angle of 180 degrees using a texture analyzer (Stable Micro Systems, UK) to evaluate re-workability according to the following criteria:

<Criteria for Evaluating Re-Workability>
○: when the polarizing plate was easily peeled and thus no transfer residue remained
Δ: when peeling was not easy, or some transfer residue of the pressure-sensitive adhesive remained on the glass after peeling
×: when peeling was very difficult, enough to destroy the polarizing plate or glass, or a large amount of a transfer residue of the pressure-sensitive adhesive remained on the glass 6. Durability and Reliability and Durability and Reliability after Long-Term Storage A specimen was manufactured by cutting a polarizing plate formed in Example or Comparative Example so as to have a width of 90 mm and a length of 170 mm, and two sheets of the specimen manufactured as described above were attached to both surfaces of a glass having a width of 110 mm, a length of 190 mm and a thickness of 0.7 mm so as for light-absorption axes of the polarizing plate to be crossed with each other, thereby preparing a sample. A pressure applied in the attachment was approximately 5 kg/cm², and the process was performed in a clean room to prevent entering of impurities or bubbles.

The humidity and heat resistance properties were evaluated by observing whether bubbles were generated or peeling occurred after the sample was left under conditions of a temperature of 60° C. and relative humidity of 90% for 1,000 hours.

In addition, heat resistance was evaluated by observing whether bubbles were generated or peeling occurred after the sample was left at 80° C. for 1,000 hours.

Evaluation of the humidity and heat resistance or heat resistance properties was performed after the specimen obtained after being left under the humidity and heat resistance or heat resistance condition was maintained at room temperature for 24 hours.

In addition, the durability and reliability after long-term storage was evaluated by examining the humidity and heat resistance and heat resistance properties in the same manner as described above after the sample was maintained for 5 months or more under conventional storage conditions.

Criteria for evaluating the durability and reliability were as follows:

<Criteria for Evaluating Durability>
○: No bubbles were generated and no peeling occurred.
Δ: Some bubbles were generated and/or peeling somewhat occurred.
×: A large amount of bubbles were generated and/or peeling considerably occurred.

PREPARATION EXAMPLE 1

96 parts by weight of n-butyl acrylate (n-BA), 3.9 parts by weight of hydroxybutyl acrylate, and 0.1 parts by weight of acrylic acid were poured into a 1L reactor in which a nitrogen gas is refluxed and which has a cooling apparatus to facilitate temperature control, and a suitable amount of n-dodecyl mercaptan (n-DDM) was added. After 150 parts by weight of ethyl acetate was poured as a solvent, the reactor was purged with nitrogen gas for 60 minutes to remove oxygen. Afterward, the temperature was maintained at 66° C., 0.03 parts by weight of azobisisobutyronitrile (AIBN) was added as a reaction initiator, and the reaction product was diluted with ethyl acetate after a 16 hours reaction, thereby preparing an acrylic polymer solution (A1)

having a weight average molecular weight of 950,000 and a solid content of 25.7 weight %.

PREPARATION EXAMPLES 2 to 10

Acrylic polymer solutions (A2 to A9) were prepared in the same manner as described in Example 1, except that components were controlled as shown in the following Table 1:

TABLE 1

| | | Preparation Example | | | | | | | | |
|---|---|---|---|---|---|---|---|---|---|---|
| | | 1 | 2 | 3 | 4 | 5 | 6 | 7 | 8 | 9 | 10 |
| Acrylic polymer Solution | | A1 | A2 | A3 | A4 | A5 | A6 | A7 | A8 | A9 | A10 |
| Composition of Monomer | n-BA | 96 | 96 | 96 | 98 | 93 | 96 | 96 | 96 | 99 | 96 |
| | HBA | 3.9 | 3.9 | 3.7 | 2 | 6.7 | 3.9 | 3.9 | 3.9 | 1 | 3.9 |
| | AA | 0.1 | 0.1 | 0.3 | 0.3 | 0.3 | 0.03 | 0.5 | 0.1 | — | 0.1 |
| AIBN | | 0.03 | 0.03 | 0.03 | 0.03 | 0.03 | 0.03 | 0.03 | 0.03 | 0.03 | 0.03 |
| nDDM | | 0.05 | 0.1 | 0.05 | 0.05 | 0.05 | 0.05 | 0.05 | 0.2 | — | — |
| EAc | | 120 | 120 | 120 | 120 | 120 | 120 | 120 | 120 | 120 | 120 |
| Mw (unit: ×10,000) | | 95 | 75 | 93 | 94 | 94 | 93 | 94 | 60 | 150 | 110 |

Content unit: part by weight
n-BA: n-butyl acrylate
HBA: hydroxybutyl acrylate
AA: acrylic acid
AIBN: azobisisobutyronitril
nDDN: n-dodecyl mercaptan
EAc: ethyl acetate
Mw: weight average molecular weight

EXAMPLE 1

Preparation of Pressure-Sensitive Adhesive Composition (Coating Solution)

A coating solution (pressure-sensitive adhesive composition) was prepared by blending 0.1 parts by weight of a multifunctional crosslinking agent (a tolylenediisocyanate addition product of trimethylol propane, TDI-1) and 0.1 parts by weight of beta-cyanoacetylpropyl trimethoxy silane (LG Chemical Ltd., M-812) relative to 100 parts by weight of a solid content of the acrylic polymer solution (A1) of Preparation Example 1, and diluting the resulting product to have the coating solid content in an amount of approximately 22 weight %.

Preparation of Pressure-Sensitive Polarizing Plate

A pressure-sensitive adhesive layer was formed by coating the prepared coating solution on a release-treated surface of a poly(ethyleneterephthalate) (PET; MRF-38, Mitsubishi) film to have a thickness of 30 μm after drying, and drying the coated film under a suitable condition to have a gel fraction of approximately 70%. A pressure-sensitive polarizing plate was prepared by laminating the formed pressure-sensitive adhesive layer on one surface of an iodine-based polarizing plate having a thickness of 185 μm.

EXAMPLES 2 and 3 and COMPARATIVE EXAMPLES 1 to 7

A polarizing plate was prepared in the same manner as described in Example 1, except that the composition of a pressure-sensitive adhesive composition, the gel fraction of a pressure-sensitive adhesive and the coating solid content were as shown in the following Table 2. Though Comparative Example 7 uses a pressure-sensitive adhesive composition containing an acrylic polymer having a high molecular weight to have a coating solid content of 20%, it was impossible to perform coating and form a pressure-sensitive adhesive layer. Thus, a gel fraction could not be measured.

TABLE 2

| | Example | | | | Comparative Example | | | | | | |
|---|---|---|---|---|---|---|---|---|---|---|---|
| | 1 | 2 | 3 | 4 | 1 | 2 | 3 | 4 | 5 | 6 | 7 |
| Kind of Polymer Solution | A1 | A2 | A3 | A10 | A1 | A4 | A5 | A6 | A7 | A8 | A9 |
| Solid Content in Polymer Solution | 100 | 100 | 100 | 100 | 100 | 100 | 100 | 100 | 100 | 100 | 100 |
| Content of Crosslinking Agent | 0.1 | 0.1 | 0.1 | 0.1 | 0.05 | 0.1 | 0.1 | 0.1 | 0.07 | 0.2 | 0.1 |
| Content of Coupling Agent | 0.1 | 0.1 | 0.1 | 0.1 | 0.1 | 0.1 | 0.1 | 0.1 | 0.1 | 0.1 | 0.1 |
| Gel Fraction (unit: %) | 70 | 66 | 75 | 70 | 35 | 20 | 90 | 45 | 75 | 65 | — |
| Coating solid content (unit: %) | 22 | 25 | 22 | 20 | 23 | 22 | 22 | 22 | 22 | 27 | 20 |

Content unit: part by weight
Crosslinking agent: tolylene diisocyante addition product of trimethylolpropane (TDI-1)
Coupling agent: beta-cyanoacetylpropyl trimethoxy silane (LG Chemical Ltd., M-812)

Evaluation results for physical properties with respect to Examples and Comparative Examples were summarized in Table 3.

TABLE 3

| | | Example | | | | Comparative Example | | | | | | |
|---|---|---|---|---|---|---|---|---|---|---|---|---|
| | | 1 | 2 | 3 | 4 | 1 | 2 | 3 | 4 | 5 | 6 | 7 |
| Coatability | | ○ | ○ | ○ | ○ | ○ | ○ | ○ | ○ | ○ | ○ | X |
| Re-workability | | ○ | ○ | ○ | ○ | X | X | ○ | X | ○ | X | — |
| Durability & Reliability | Heat resistance | ○ | ○ | ○ | ○ | ○ | ○ | ○ | ○ | ○ | Δ | — |
| | Humidity and heat resistance | ○ | ○ | ○ | ○ | Δ | ○ | Δ | ○ | Δ | Δ | — |
| Durability & Reliability After Long-term Storage | Heat resistance | ○ | ○ | ○ | ○ | Δ | Δ | ○ | Δ | ○ | X | — |
| | Humidity and heat resistance | ○ | ○ | ○ | ○ | X | X | X | X | X | X | — |

As seen from the results in Table 3, Examples 1 to 4 showed excellent re-workability, durability and reliability and coatability, and also showed excellent durability and reliability even after long-term storage.

Meanwhile, in Comparative Examples 1 to 4, coating was possible due to a large solid content (coating solid content), but the re-workability and the durability and reliability were degraded. In addition, in Comparative Example 5, it was impossible to ensure the durability and reliability during long-term storage, and Comparative Example 6 was degraded in re-workability and durability and reliability. In addition, in Comparative Example 7, it was impossible to evaluate the physical properties since it was impossible to perform coating and form a pressure-sensitive adhesive layer from the beginning when the coating solid content was set to 20%.

A pressure-sensitive adhesive composition of the present application can be effectively coated even when the coating solid content of the composition is high. Thus, the pressure-sensitive adhesive composition can have considerably increased productivity in formation of a pressure-sensitive adhesive or manufacture of an optical film such as a polarizing plate, and excellent durability and reliability and re-workability even after being formed into a pressure-sensitive adhesive.

What is claimed is:

1. A pressure-sensitive adhesive composition for an optical film, comprising:
    an acrylic polymer which comprises 80 to 96 parts by weight of (meth)acrylic acid ester monomer, 3.5 to 5.5 parts by weight of monomer having hydroxyl group, 0.05 to 0.3 parts by weight of monomer having carboxyl group, the acrylic polymer prepared in the presence of 0.05 to 0.1 parts by weight of n-dodecyl mercaptan relative to 100 parts by weight of total monomers forming the acrylic polymer and of which a weight average molecular weight of 700,000 to 950,000;
    a multifunctional crosslinking agent; and
    a silane coupling agent represented by Formula 1,
    wherein a coating solid content is 20 to 22 weight %, and a gel fraction is 55 weight % to 85 weight % after being crosslinked and wherein the (meth)acrylic acid ester monomer is methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isobornyl (meth)acrylate, isooctyl (meth)acrylate, isononyl (meth)acrylate or lauryl (meth)acrylate,
    wherein the pressure-sensitive adhesive composition has a viscosity at 23° C. of 900 to 2,300 cP in the state having a solids content of 20 to 22 weight %:

$$(R_1)_n Si(R_2)_{(4-n)}$$ [Formula 1]

wherein $R_1$ is a beta-cyanoacetyl group or beta-cyanoacetylalkyl group, $R_2$ is an alkoxyl group, and n is a number between 1 and 3.

2. The pressure-sensitive adhesive composition for an optical film of claim 1, wherein the monomer having hydroxyl group is hydroxyalkyl (meth)acrylate or hydroxyalkyleneglycol (meth)acrylate.

3. The pressure-sensitive adhesive composition for an optical film of claim 1, wherein the monomer having carboxyl group is (meth)acrylic acid, acrylic acid dimer, itaconic acid, maleic acid or maleic acid anhydride.

4. The pressure-sensitive adhesive composition for an optical film of claim 1, wherein the multifunctional crosslinking agent is an isocyanate crosslinking agent.

5. The pressure-sensitive adhesive composition for an optical film of claim 1, wherein the multifunctional crosslinking agent is comprised in an amount of 0.01 to 5 parts by weight, relative to 100 parts by weight of the acrylic polymer.

6. The pressure-sensitive adhesive composition for an optical film of claim 1, wherein the silane coupling agent is comprised in an amount of 0.01 to 5 parts by weight relative to 100 parts by weight of the acrylic polymer.

7. The pressure-sensitive adhesive composition for an optical film of claim 1, wherein the gel fraction after being crosslinked is 60 to 80 weight %.

* * * * *